Oct. 25, 1932.  B. L. P. PLANTIN  1,884,983
MECHANISM FOR FLUID DISTRIBUTION SYSTEMS
Filed Sept. 28, 1926
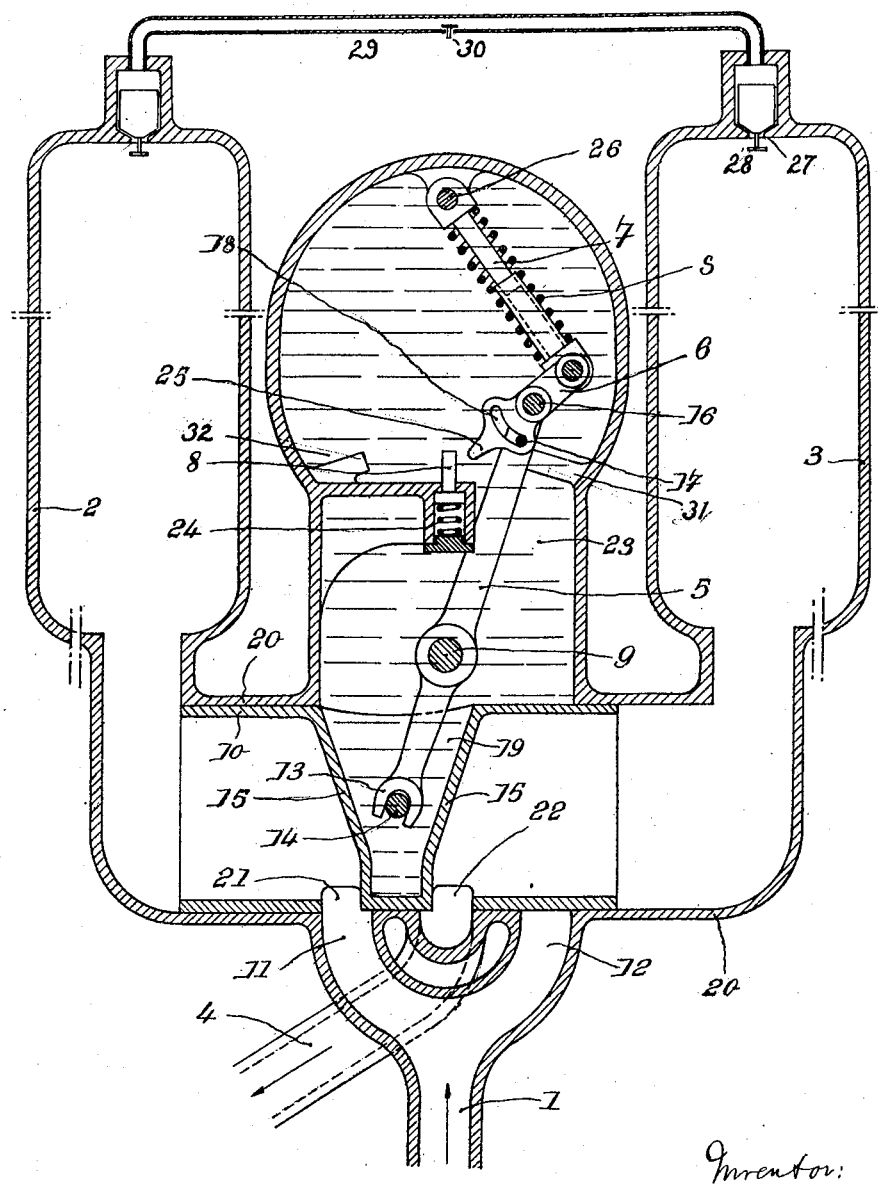

Patented Oct. 25, 1932

1,884,983

UNITED STATES PATENT OFFICE

BERNARD L. P. PLANTIN, OF BRUSSELS, BELGIUM, ASSIGNOR TO SOCIETE HARDOLL, ANCIENS ETABLISSEMENTS HARIVEAU & DOLIMIER ET RENÉ PORTE & CIE RÉUNIS, A FRENCH SOCIETY, OF LEVALLOIS-PERRET, SEINE, FRANCE

MECHANISM FOR FLUID DISTRIBUTION SYSTEMS

Application filed September 28, 1926, Serial No. 138,241, and in Belgium October 8, 1925.

This invention relates to rapidly operating reversing mechanisms for fluid distribution systems and, more particularly, to those of the type employed in connection with gasoline measuring devices.

One of the objects of the invention is to provide a reversing device which requires only a slight starting movement to completely reverse itself.

Another object is to provide a combined piston diaphragm and reversing valve, capable of reversing itself under differences of pressure.

Further objects will appear in the course of the detailed description which will now be given in connection with the accompanying drawing in which the single figure shows, diagrammatically, a vertical section through one illustrative embodiment of the invention as applied to a gasoline measuring apparatus.

The feed conduit 1 is provided with branch conduits 11 and 12 through which the liquid to be measured is supplied under pressure alternately to the measuring chambers 2 and 3. These chambers may be of any desired size, and each chamber is provided with a vent opening 27 controlled by a float valve 28 which closes the vent opening when the chamber is filled with the liquid to be measured. The pipe 29 connects the two vent openings, and thus it is that one chamber may vent into the other chamber. Centrally of the pipe 29 is a vent to the atmosphere indicated at 30, and this is controlled by a valve.

A discharge conduit 4 communicates through the opening 21 or opening 22 in a reversing valve 10 with the measuring chambers 2 and 3, respectively. The measuring chambers are connected by a cylindrical member 20 and the reversing valve is located in this cylindrical connection. When the parts are positioned as shown in the drawing, the liquid to be measured is supplied from the conduit 1 through the opening 21 to the measuring chamber 2. At the same time, the measured quantity of liquid in the chamber 3 is being discharged through the opening 22 into the conduit 4. The reversing valve 10 is hollow, and is divided intermediate its ends by cross walls or diaphragms 15, 15, which are spaced from each other. This provides separate chambers in the ends of the valve which communicate with the measuring chambers and the intake or discharge conduits according to the position of the valve. It will thus be seen that when the liquid to be measured enters the chamber, it will fill the chamber until it closes the vent. As soon as it closes the vent, then the pressure developing on the liquid will bear against the wall 15 and force the valve to the right as viewed in the figure.

The reversing mechanism includes a lever 5 pivoted at 9 to the framework of the apparatus and connected by a forked end 13 to a pin 14 which is fixed to the valve. When the valve moves, it will rock the lever 5 on its pivotal support 9. The upper end of the lever 5 is connected at 16 to a lever arm 6, and this lever arm 6 is pivotally connected at its upper end to a telescoping link 7; that is, a link formed of telescoping parts. This telescopic link is pivoted at 26 to the framework of the apparatus. The lever arm 6 has an extension 25 which is slotted at 18. The slot 18 is formed on an arc about the center of the pivot 16. The pin 17 carried by the link 5 extends through the slot. The frame is provided with a stop lug 31. Surrounding the telescoping link 7 is a compressible spring S. As viewed in the figure of the drawing, this compression spring bearing on the lever 6 has forced the same to a position where the pin 17 engages the end of the slot 18, and the lever 5 is carried over into contact with the stop 31. There is a corresponding lug 32 on the other side of the frame against which the lever bears when in reversed position. Mounted on the frame is a yielding abutment 8. This abutment rests on a spring 24 which normally holds it raised.

The operation of the parts is as follows. The measuring chamber 2 is receiving a liquid when the parts are positioned as shown in the figure. When the vent closes, after a measured quantity has been supplied to this measuring chamber, then the pressure developing on the liquid will force the valve to the right. This movement of the valve tends to close the conduit 21 supplying the liquid to the measuring chamber. The movement of the valve swings the upper end of the lever 5 to the left as viewed in the figure. This movement of the lever will compress the spring S and thus store power which is utilized later to complete the movement of the valve. As the lever continues its movement to the left, the extension 25 will engage the abutment 8. When this extension engages the abutment 8, it will cause the pin 17 to move away from the end of the slot, and this will change the relative position of the pivotal connections, and cause the stored power in the spring S to operate to continue the movement of the lever 5 at its upper end until it engages the lug 32. The abutment 8 will yield at the proper time to allow the extension 25 to pass. Thus it is that the stored power completes the shifting of the valve. By this arrangement, the stored power comes into action to complete the movement of the valve a little before communication through the opening 21 with the conduit 11 is completely interrupted. The stored power takes up the movement of the valve before the upper end of the lever 5 arrives at its halfway position. It will thus be seen that the pressure developing on the liquid when the measuring chamber is filled with the liquid to be measured, operates directly and positively to move the valve through the first part of its movement, and at the same time, it operates through the means provided for storing power, for storing power to complete the movement of the valve, and it also initiates the operation of the stored power before the opening is closed through which the liquid is supplied.

It is obvious that minor changes in the details of construction and the arrangement of the parts may be made without departing from the spirit of the invention as set forth in the appended claims.

What I claim is:

1. In an apparatus of the class described, the combination of two measuring chambers of given capacity, means for supplying liquid to said chambers under pressure, means for venting said chambers during filling and for closing said vent when the chamber is filled with the measured quantity of liquid, a movable valve for controlling the supply to and the discharge from said chambers, means whereby the pressure developing on the liquid when the chamber is filled with the measured quantity directly and positively imparts a movement to the valve, means whereby said movement of the valve stores power for completing the movement of the valve and initiates the operation of the stored power, said last-named means including a pivoted lever connected to the valve and movable therewith, a lever arm pivoted to the lever and having a limited movement relative to the lever, a yielding abutment cooperating with said lever arm, and a spring associated with said lever arm in which power is stored by the first part of the movement of the valve, said parts being disposed so that said yielding abutment shifts the position of the lever arm relative to the lever whereby the stored power becomes operative to move the lever and complete the movement of the valve.

2. In an apparatus of the class described, the combination of two measuring chambers of given capacity, a reversing valve for controlling the supply to and the discharge from said chambers, said valve being disposed so as to be subject to the pressure developing on the liquid when the measuring chamber is filled, a yielding abutment, a lever pivoted intermediate its ends and connected to said valve so as to move with said valve, a lever arm connected to the other end of said first-named lever and having an extension adapted to cooperate with said yielding abutment, said extension having a slot formed therein adapted to engage a pin on the lever, so that the movement of the lever arm relative to the lever is limited, an extensible link connected at one end to the outer end of the lever arm and to the frame directly above the pivot of the lever, and resilient means tending to extend said link.

3. In an apparatus of the class described, the combination of two measuring chambers of given capacity, a reversing valve for controlling the supply to and the discharge from said chambers, said valve being disposed so as to be subject to the pressure developing on the liquid when the measuring chamber is filled, a yielding abutment, a lever pivoted intermediate its ends and connected to said valve so as to move with said valve, a lever arm connected to the other end of said first-named lever and having an extension adapted to cooperate with said yielding abutment, said extension having a slot formed therein adapted to engage a pin on the lever, so that the movement of the lever arm relative to the lever is limited, an extensible link connected at one end to the outer end of the lever arm and to the frame directly above the pivot of the lever, resilient means tending to extend said link, said abutment being disposed in a line passing through the pivot of the lever and the connection of the extensible link with the frame, and stop lugs for limiting the movement of the lever.

4. In a liquid dispensing apparatus, a framework, an articulation system comprising a rigid portion and a telescoping portion provided with an elastic element, the said portions being articulatedly mounted on the framework, the points of articulation and the relative position of the different portions being selected in such manner that a partial displacement of the rigid portion stores up, in the elastic element, a force which is utilized to overcome the dead point at the said rigid portion and to rapidly complete the travel of the said portion.

5. In a liquid dispensing apparatus, the combination of a framework, a reversing element, and an articulated system comprising a rigid portion and a telescoping portion provided with an elastic element, the said portions being articulatedly mounted on the framework, the points of articulation of said system and the relative position of the different portions being selected in such manner that a partial displacement of the rigid portion stores up in the elastic element a force which is utilized to overcome the dead point of the said rigid portion and for rapidly completing the travel of the said portion, said reversing element being connected to said rigid portion to move therewith.

6. In a liquid dispensing apparatus, a framework, an articulated system comprising a rigid portion and a telescoping portion, said portions being articulatedly mounted on the framework, connecting means between the said rigid portion and the said telescoping portion, and an abutment mounted on the framework and located in the plane passing through the axis of the articulated mounting of said rigid and telescoping portions.

7. In a liquid dispensing apparatus, a framework, an articulated system comprising a rigid portion and a telescoping portion, the said portions being articulatedly mounted on the framework, connecting means between the said rigid portion and the said telescoping portion, an elastic element on the telescoping portion, an extension on the connecting means, and an abutment mounted on the framework of the dispensing device; the points of articulation and the relative position of the different portions being selected in such manner that the elastic element is tensed by the displacement of the rigid portion before attaining the dead point, and that the force thus stored up in the said element is utilized as motive power for abruptly engaging and carrying along with it the said rigid portion in the subsequent movement in the same direction.

8. In a liquid dispensing apparatus, in combination: a framework, a reversing element for the filling and discharge alternately of coupled reservoirs, and an articulated system comprising a rigid portion and a telescoping portion, the said portions being articulatedly mounted on the framework, connecting means between the said rigid portion and the said telescoping portion, an abutment located in the plane passing through the axes of articulation of the said rigid and said telescoping portions, and means combined with the telescoping portion and disposed to store up a force during the movement of the rigid portion before attaining the dead point and restoring this force to compel the said rigid portion to complete the subsequent movement in the same direction, said reversing element being connected with said rigid portion to move therewith.

9. In a liquid dispensing apparatus, the combination of a framework, a reversing element for the filling and discharge alternately of coupled reservoirs, and an articulated system comprising a rigid portion, a telescoping portion and connecting means between the said rigid portion and the said telescoping portion, said portions being articulatedly mounted on said framework, the said reversing element being connected to said rigid portion to move therewith and acting as a motor to move the articulated system before the rigid portion of the said articulated system attains the vicinity of the dead point and to store up a force in the means combined with the telescoping portion and being subjected subsequently to the effects of this force to pass the dead point and complete its movement in the same direction.

10. In the liquid dispensing apparatus, in combination: a framework, a reversing element for the filling and discharge alternately of coupled reservoirs, an abutment mounted on the frame of the dispensing apparatus, and an articulated system comprising a rigid portion articulated on a fixed axis of the framework, a telescoping portion articulated on a fixed axis of the framework on a plane intersecting the abutment and the axis of articulation of the said rigid portion, the said portions being articulatedly mounted on the framework, a spring on the said telescoping portion, and connecting means between the said rigid and telescoping portions provided with a portion co-acting with the fixed abutment for tensing the spring before the rigid portion of the articulated system attains the dead point and permitting the force stored up in the said spring to act on the said rigid portion to cause it to overcome the dead point, said reversing element being connected to said rigid portion to move therewith.

11. A liquid dispensing apparatus, the combination of a frame-work, a reversing piston valve for the filling and discharging alternately of coupled reservoirs, and an articulated system comprising a first lever mounted intermediate its length on a fixed pivot on said framework, a telescoping link mounted on one end on a fixed pivot on said framework, a spring to extend said telescoping link, a second lever pivoted at one end to the free end of said telescoping link and pivoted intermediate its length to one arm of said lever and having a projection at its other end, means to limit the rocking movement of said second lever, an abutment on said framework, a resilient means to hold said abutment in the path of said projection, said first lever being connected at its other end to said piston valve whereby the movement of the piston valve from one end position will rock said first lever and store up power in said spring until the movement of said first lever and the storage of power in said spring causes said projection to push said abutment out of its path and whereby thereafter the power stored in said spring will cause said first lever to move said piston valve into its other end position.

In testimony whereof I have hereunto set my hand.

BERNARD L. P. PLANTIN.